(12) United States Patent
Shaick

(10) Patent No.: US 8,965,046 B2
(45) Date of Patent: Feb. 24, 2015

(54) METHOD, APPARATUS, AND MANUFACTURE FOR SMILING FACE DETECTION

(75) Inventor: Ben-Zion Shaick, Zichron Yaacov (IL)

(73) Assignee: QUALCOMM Technologies, Inc., San Diego, CA (US)

( * ) Notice: Subject to any disclaimer, the term of this patent is extended or adjusted under 35 U.S.C. 154(b) by 273 days.

(21) Appl. No.: 13/423,039

(22) Filed: Mar. 16, 2012

(65) Prior Publication Data
US 2013/0243241 A1 Sep. 19, 2013

(51) Int. Cl.
*G06K 9/62* (2006.01)

(52) U.S. Cl.
USPC .................................................. 382/103

(58) Field of Classification Search
None
See application file for complete search history.

(56) References Cited

U.S. PATENT DOCUMENTS

| | | | |
|---|---|---|---|
| 5,960,097 A | 9/1999 | Pfeiffer et al. |
| 6,038,337 A | 3/2000 | Lawrence et al. |
| 6,128,398 A | 10/2000 | Kupferstein et al. |
| 7,014,102 B2 | 3/2006 | Oohashi |
| 7,123,754 B2 | 10/2006 | Matsuo et al. |
| 7,277,891 B2 | 10/2007 | Howard et al. |
| 7,362,368 B2 | 4/2008 | Steinberg et al. |
| 7,433,495 B2 | 10/2008 | Rui et al. |
| 7,526,193 B2 | 4/2009 | Minato et al. |
| 7,664,389 B2 | 2/2010 | Kretz et al. |
| 7,747,159 B2 | 6/2010 | Uenishi |
| 7,787,762 B2 | 8/2010 | Abe |
| 7,853,140 B2 | 12/2010 | Sugimoto |
| 7,889,886 B2 | 2/2011 | Matsugu et al. |
| 7,912,363 B2 | 3/2011 | Minato et al. |
| 7,920,785 B2 | 4/2011 | Kretz et al. |
| 7,961,908 B2 | 6/2011 | Tzur et al. |
| 8,005,271 B2 | 8/2011 | Kawada |
| 8,036,522 B2 | 10/2011 | Vydhynathan et al. |
| 8,130,243 B2 | 3/2012 | Sudo et al. |
| 2005/0129276 A1 | 6/2005 | Haynes et al. |
| 2006/0177110 A1 | 8/2006 | Imagawa et al. |
| 2006/0203108 A1 | 9/2006 | Steinberg et al. |
| 2007/0047941 A1 | 3/2007 | Iwane et al. |

(Continued)

FOREIGN PATENT DOCUMENTS

WO WO 2006/082430 8/2006
WO 2006117942 A1 11/2006

OTHER PUBLICATIONS

A 100MHz Hardware-Efficient Boost Cascaded Face Detection Design. Wei-Su Wong , Chih-Rung Chen , and Ching-Te Chiu. 2009.*

(Continued)

*Primary Examiner* — Stephen R Koziol
*Assistant Examiner* — Delomia Gilliard
(74) *Attorney, Agent, or Firm* — Knobbe, Martens, Olson & Bear LLP

(57) ABSTRACT

A method, apparatus, and manufacture for smiling face detection is provided. For each frame, a list of new smiling faces for the frame is generated by performing smiling face detection employing an object classifier that trained is to distinguish between smiling faces and all objects in the frame that are not smiling faces. For the first frame, the list of new smiling faces is employed as an input smiling face list for the next frame. For each frame after the first frame, a list of tracked smiles for the frame is generated by tracking smiling faces in the frame from the input smiling list for the frame. Further, a list of new smiling faces is generated for the next frame by combining the list of new smiling faces for the frame with the list of tracked smiles for the frame.

20 Claims, 3 Drawing Sheets

(56) References Cited

U.S. PATENT DOCUMENTS

| | | |
|---|---|---|
| 2007/0122010 A1 | 5/2007 | Kitamura et al. |
| 2008/0089560 A1 | 4/2008 | Li et al. |
| 2008/0170751 A1 | 7/2008 | Lei et al. |
| 2008/0181453 A1 | 7/2008 | Xu et al. |
| 2008/0181460 A1 | 7/2008 | Tamaru |
| 2008/0240497 A1 | 10/2008 | Porikli et al. |
| 2008/0279424 A1 | 11/2008 | Berrani et al. |
| 2008/0284867 A1 | 11/2008 | Ishihara |
| 2008/0285791 A1 | 11/2008 | Suzuki et al. |
| 2008/0317285 A1 | 12/2008 | Abe |
| 2008/0317295 A1 | 12/2008 | Koutaki |
| 2009/0046900 A1 | 2/2009 | Ogawa |
| 2009/0080713 A1* | 3/2009 | Bigioi et al. .................. 382/118 |
| 2009/0190803 A1 | 7/2009 | Neghina et al. |
| 2010/0021008 A1 | 1/2010 | Shaick |
| 2010/0123816 A1* | 5/2010 | Koh et al. ................ 348/333.05 |
| 2010/0158325 A1 | 6/2010 | Piramuthu et al. |
| 2010/0188520 A1 | 7/2010 | In et al. |
| 2011/0191329 A1* | 8/2011 | Petrov et al. .................. 707/723 |
| 2012/0092516 A1* | 4/2012 | Hata .......................... 348/222.1 |

OTHER PUBLICATIONS

Face Detection and Smile Detection. Yu Huang and Chiou-Shann Fuh. Dept. of Computer Science and Information Engineering, National Taiwan University; Dept. of Computer Science and Information Engineering, National Taiwan University Dec. 2009.*

Toward Practical Smile Detection. Jacob Whitehill, Gwen Littlewort, Ian Fasel, Marian Bartlett, Javier Movellan. Nov. 2009.*

Method for Intelligent, Targeted Behavioral Identification, Tracking and Concatenative Alignment Assistance across Plurality of Subjects and Media in Digital Media. IP.com. Dec. 2011.*

Sharing Visual Features for Multiclass and Multiview Object Detection. Antonio Torralba, Kevin P. Murphy, and William T. Freeman. May 2007.*

Search Report for British Patent Application No. GB1216254.1 mailed Jul. 23, 2013.

* cited by examiner

METHOD, APPARATUS, AND MANUFACTURE FOR SMILING FACE DETECTION

TECHNICAL FIELD

The invention is related to object recognition and tracking, and in particular, but not exclusively, to a method, apparatus, and manufacture for smiling face detection in which the object classifier is trained to distinguish between smiling faces and all objects in the frame that are not smiling faces.

BACKGROUND

Electronic cameras image scenes onto a two-dimensional sensor such as a charge-coupled-device (CCD), a complementary metal-on-silicon (CMOS) device or other type of light sensor. These devices include a large number of photo-detectors (typically two, three, four or more million) arranged across a small two dimensional surface that individually generate a signal proportional to the intensity of light or other optical radiation (including infrared and ultra-violet regions of the spectrum adjacent the visible light wavelengths) striking the element. These elements, forming pixels of an image, are typically scanned in a raster pattern to generate a serial stream of data representative of the intensity of radiation striking one sensor element after another as they are scanned. Color data are most commonly obtained by using photo-detectors that are sensitive to each of distinct color components (such as red, green and blue), alternately distributed across the sensor.

A popular form of such an electronic camera is a small hand-held digital camera that records data of a large number of picture frames either as still photograph "snapshots" or as sequences of frames forming a moving picture. A significant amount of image processing is typically performed on the data of each frame within the camera before storing on a removable non-volatile memory such as a magnetic tape cartridge, a flash memory card, a recordable optical disk or a hard magnetic disk drive. The processed data are typically displayed as a reduced resolution image on a liquid crystal display (LCD) device on the outside of the camera. The processed data are also typically compressed before storage in the non-volatile memory in order to reduce the amount of storage capacity that is taken by the data for each picture frame.

The data acquired by the image sensor are typically processed to compensate for imperfections of the camera and to generally improve the quality of the image obtainable from the data. The correction for any defective pixel photodetector elements of the sensor is one processing function. Another is white balance correction wherein the relative magnitudes of different pixels of the primary colors are set to represent white. This processing also includes de-mosaicing the individual pixel data to superimpose data from spatially separate monochromatic pixel detectors of the sensor to render superimposed multi-colored pixels in the image data. This de-mosaicing then makes it desirable to process the data to enhance and smooth edges of the image. Compensation of the image data for noise and variations of the camera optical system across the image and for variations among the sensor photodetectors is also typically performed within the camera. Other processing typically includes one or more of gamma correction, contrast stretching, chrominance filtering and the like.

Electronic cameras also nearly always include an automatic exposure control capability that sets the exposure time, size of its aperture opening and analog electronic gain of the sensor to result in the luminescence of the image or succession of images being at a certain level based upon calibrations for the sensor being used and user preferences. These exposure parameters are calculated in advance of the picture being taken, and then used to control the camera during acquisition of the image data. For a scene with a particular level of illumination, a decrease in the exposure time is made up by increasing the size of the aperture or the gain of the sensor, or both, in order to obtain the data within a certain luminescence range. An increased aperture results in an image with a reduced depth of field and increased optical blur, and increasing the gain causes the noise within the image to increase. Conversely, when the scene is brightly lighted, the aperture and/or gain are reduced and compensated for by increasing the exposure time, the resulting image having a greater depth of field and/or reduced noise. In addition to analog gain being adjusted, or in place of it, the digital gain of an image is often adjusted after the data have been captured.

Other processing that may also be performed by electronic cameras includes a detection of the likelihood that a certain type of object is present within the image. An example object is a human face. When there is a likelihood that the object is present in the image, its location is also determined. This allows the camera to act differently upon that portion of the image during acquisition and/or processing of the acquired data.

BRIEF DESCRIPTION OF THE DRAWINGS

Non-limiting and non-exhaustive embodiments of the present invention are described with reference to the following drawings, in which.

DETAILED DESCRIPTION

Figure 1:
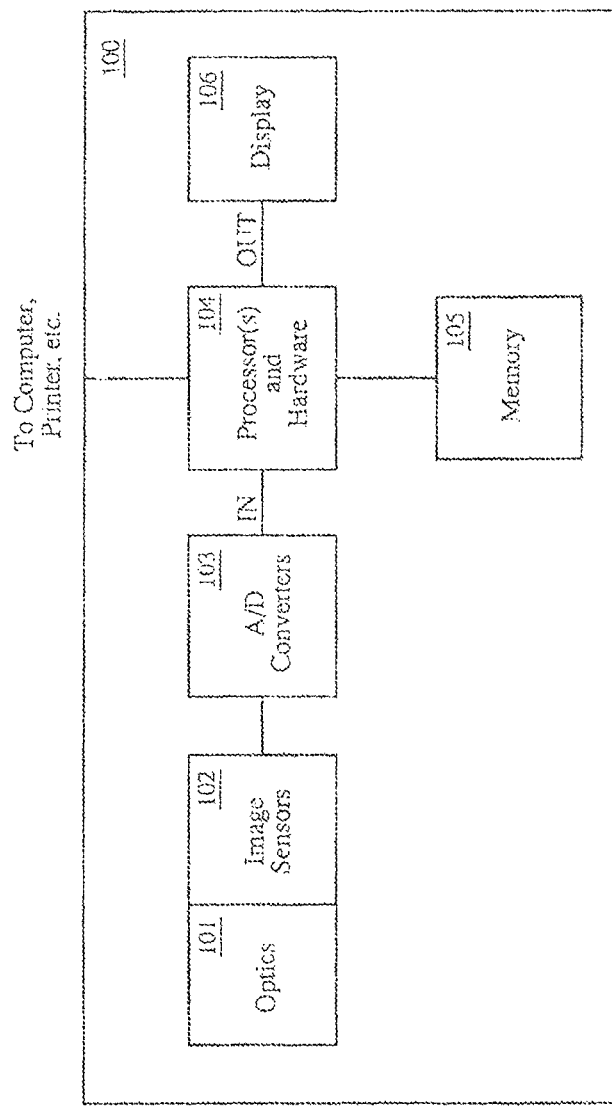
FIG. 1 illustrates a block diagram of an embodiment of an imaging device.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "signal" means at least one current, voltage, charge, temperature, data, or other signal.

Briefly stated, the invention is related to a method, apparatus, and manufacture for smiling face detection. For each frame, a list of new smiling faces for the frame is generated by performing smiling face detection employing an object classifier that is trained to distinguish between smiling faces and all objects in the frame that are not smiling faces. For the first frame, the list of new smiling faces is employed as an input smiling face list for the next frame. For each frame after the first frame, a list of tracked smiles for the frame is generated by tracking smiling faces in the frame from the input smiling list for the frame. Further, a list of new smiling faces is generated for the next frame by combining the list of new smiling faces for the frame with the list of tracked smiles for the frame.

FIG. 1 shows a block diagram of an embodiment of device 100, which may be a digital camera or the like. Digital camera 100 includes a set of optics (e.g., one or more lenses and/or light guides) 101, a set of image sensors 102 optically coupled to the optics 101, a set of analog-to-digital (A/D) converters 103 having inputs electrically coupled to outputs of the image sensors 102, and one or more processors and hardware 104 coupled to receive the outputs of the A/D converters 103. The image sensors 102 may produce separate R, G and B color signals. Camera 100 further includes a display device 106 coupled to outputs of the processor(s) and hardware 104, and a memory 105 having bi-directional communication with the processor(s) 104. Display device 106 is optional, and is not included in all embodiments of digital camera 100.

In operation, the image sensors 102 receive input light through the optics 101 and, in response, produce analog output color signals R, G and B to the A/D converters. The A/D converters convert those input color signals to digital form, which are provided to the processor(s) 104.

The processor(s) and hardware 104 may include a CPU as well as specialized hardware, as discussed in greater detail below. Processor(s) 104 may perform any of various well-known types of processing on those input color signals. The processor(s) 104 may be or include, for example, any one or more of: a programmed microprocessor or digital signal processor (DSP), a microcontroller, an application specific integrated circuit (ASIC), a programmable logic device (PLD), etc. Processor(s) and hardware 104 may perform various processes, such as part or all of an embodiment of the process illustrated in FIG. 3.

The memory 105 may be or include, for example, anyone or more of: flash memory, read-only memory, random access memory (RAM), etc. Memory 105 may include a tangible, processor-readable storage medium that arranged to encode processor-readable code, which, when executed processor(s) 104, enables actions. Actions enabled by processor(s) 104, which may include action(s) controlled by processor(s) 104 but actually performed by other parts of digital camera 100, may perform various processes such as part of all of an embodiment of the process illustrated in FIG. 3.

Digital camera 100 is not limited to consumer digital cameras, but may include other types of imaging devices that capture images in a variety of different manners.

Processed or raw color data can be output to the display device 106 for display and/or to one or more external devices, such as a computer or printer.

Figure 2:
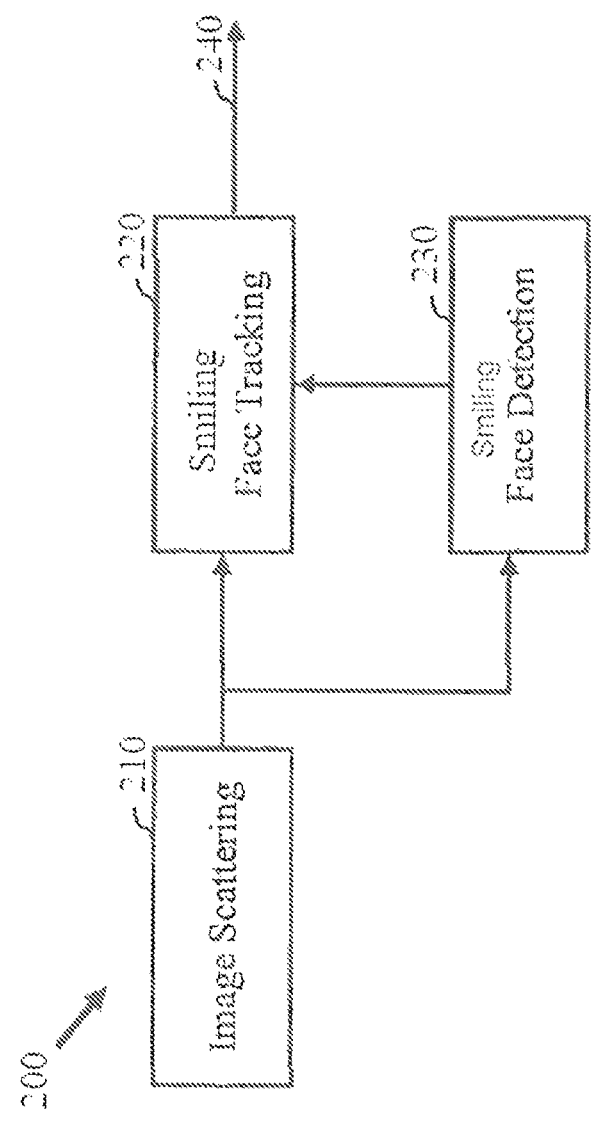
FIG. 2 shows a simplified block diagram of an embodiment of a smiling face detection system.

FIG. 2 depicts one embodiment of smile detection system 200, which includes image scatter unit 210, smiling face detection unit 230, and smiling face tracking unit 220. Image scatter unit (ISU) 210 is configured to receive a data of a frame as input. Exemplary input to the system includes, but is not limited to, quarter video graphics array (QVGA), encoded image and/or movie data (e.g., YUV) and compressed images (e.g., Y-only downscaled copies).

ISU 210 may be coupled to at least one of a detection device and processor for receiving data for the one or more frames. As used herein, a frame may relate to an image window or detection area of an imaging device, such as a photosensor, camera, video detector, etc. In certain embodiments, data received by ISU 210 may relate to a preview image of the detector. A frame may also describe detection data for a particular period of time. ISU 210 may be configured to output the received frame data for a device display. Following receipt of one or more frames, ISU 210 is configured to provide the one or more frames to smiling face detection unit (SD) 230 and smiling face tracking unit (ST) 220. SD 230 and ST 220 are image processing components that are configured to perform actions. In one embodiment, ST 220 may employ a list of smiling face coordinates and scale for tracking one or more smiling faces.

SD 230 is configured to provide potential smiling face windows. Image capture and processing may be based on detection and focusing associated with the one or more windows within a frame. Based on one or more windows supported by the image detection device, smiling face detection may be performed within the frame. SD 230 includes an object detection unit that distinguishes between smiling faces and all objects that are not smiling faces. In some embodiments, the smiling faces detected by SD 230 may be combined with smiles tracked by ST 220 to provide a list of smiling faces to be tracked by ST 220 for the next frame, as discussed in greater detail below.

According to some embodiments of the invention, smile detection system 200 may employ a list or set of one or more smiling faces to be tracked within a frame. ST 220 may be configured to provide a smiling face list that may be used by an imaging device, such as a camera, including one or more confidence levels associated with a detected smiling face. The face list may be based on the degree of confidence, as being a real human smiling face, for each face in the face list. An output smiling face list 240 may be generated by filtering out tracked smiles which are below a particular threshold confidence level. In some embodiments, the confidence level is a confidence level for each smiling face that is tracked and averaged over time. For example, in some embodiments, output smiling face list 240 is generated by removing from the list of tracked smiles each smiling face having an average confidence level that is below a threshold confidence level.

Although described as units of hardware in FIG. 2, it should be appreciated that the functions of the units may be implemented in a variety of ways including hardware, firmware, software, and/or combinations thereof. In particular, in some embodiments, smiling face tracking unit 220 may be implemented as a combination of hardware and software, and smiling face detection unit 230 may be implemented as a combination of hardware and software. The software components may includes a tangible, processor-readable storage medium that is configured to encode processor-readable code, which, when executed by one or more processors, enables actions.

Figure 3:
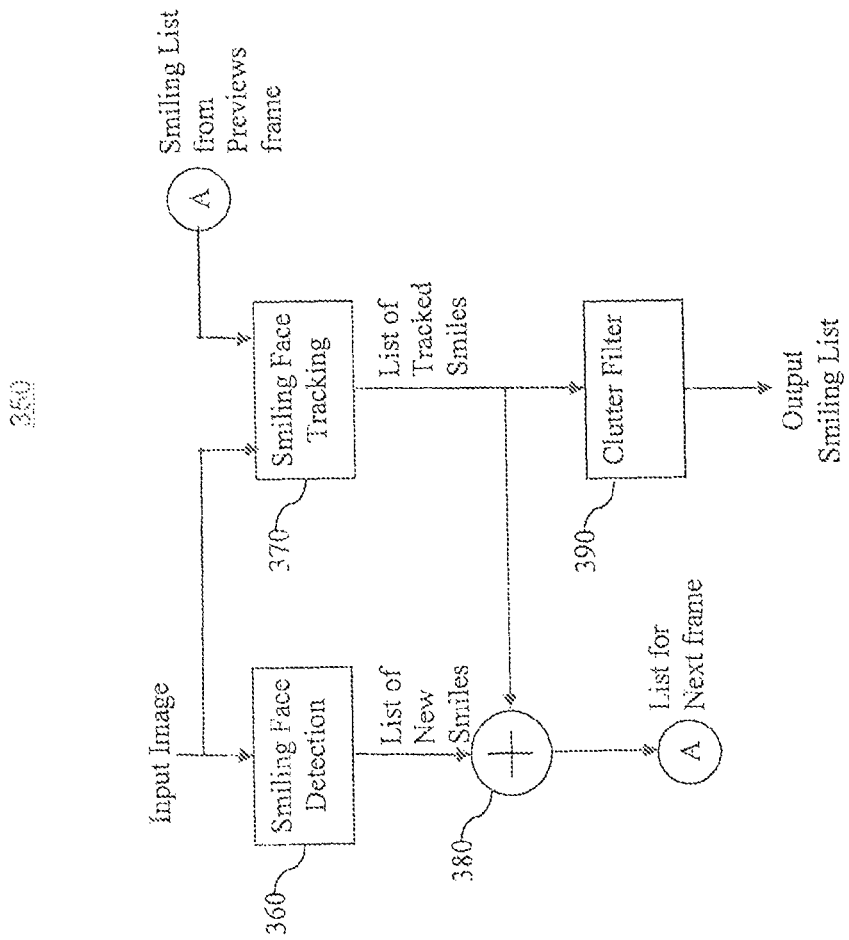
FIG. 3 illustrates a flowchart of an embodiment of a process of smiling face detection, in accordance with aspects of the invention.

FIG. 3 illustrates a flowchart of an embodiment of a process (350) of smiling face detection.

In some embodiments, process 350 may process a number of input images or frames. In some embodiments, the frames as associated with a preview image of a digital camera. For each frame, a list of new smiling faces for the frame is generated by performing smiling face detection at smiling face detection unit 360, employing an object classifier that is trained to distinguish between smiling faces and all objects in the frame that are not smiling faces. For the first frame/input image, the list of new smiling faces is employed as an input smiling face list for the next frame/input image (i.e., the second frame/input image). For each frame after the first frame, a list of tracked smiling faces for the frame is generated at smiling face tracking block 370 by tracking smiling faces in the frame from the input smiling list for the frame. Further, a list of new smiling faces is generated for the next frame at combining block 380 by combining the list of new smiling faces for the frame with the list of tracked smiles for the frame. In some embodiments, the list of tracked smiles may be filtered by clutter filter 390 to generate an output smiling list.

In some embodiments, process 350 begins when a digital camera is set in auto-capture mode or smile detection mode to automatically capture a still image whenever a person is smiling in the camera field of view, with the camera responding quickly enough before the person stops smiling. In some embodiments, a user may cause the digital camera to enter into the smile detection mode by selecting smile detection mode as an option from a menu. In some embodiments, the smile detection may be included within a self-timer mode, which takes a shot after a timer ends when a smile is detected.

In some embodiments, smiling detection process 350 is preformed in a camera preview mode where the algorithm inputs are a sequence of images. The output of the algorithm is list of smiling faces that contains faces coordinates and size for each input image. In some embodiments, the sequence of input images may be images in the preview mode of the camera. In various embodiments, the input frames may relate to a preview of image data, including still images, motion images, video, and/or imaged data.

Smiling face detection unit 360 is configured to find new faces over the entire input frame. In some embodiments, smiling face detection unit 360 may accomplished using the objection detection unit described in U.S. Pat. No. 7,961,908 titled "Detecting objects in an image being acquired by a digital camera or other electronic image acquisition device", which is hereby incorporated by reference. The object detection unit is trained with two prepared sets of databases. The first database includes a large number of smiling faces images of different persons. The set is used as a positive examples set. The second database includes a large number of images of different types of objects not including smiling faces. The set is used as a negative examples set. Cascades of classifiers are prepared by training the classifiers with the positive and negative sets. Then the object detection unit is fed with the cascades of classifiers. In this way, the object detection unit is operating as classifiers which detect the location and size of smiling faces in the input image while rejecting any other type of objects. Accordingly, the object classifier is trained to reject all objects in the image which are not smiling faces. Detection of smiling faces is accomplished using the object-detection unit solely. The object detection unit distinguishes between smiling faces and all objects that are not smiling faces. The training is performed offline, in factory before the parameters are placed in the camera. After the training is performed, the parameters resulting from the training are loaded into the camera.

In some embodiments, smiling face detection unit 360 operates as the object detection unit described in U.S. Pat. No. 7,961,908, except that rather than using the human face as the object being detected, the smiling human face is the object being detected. The classifiers distinguish between smiling human faces and all objects that are not smiling human faces. Rather than being a two-stage process in which first an object detection unit distinguishes between faces and non-faces, and then a subsequent determination is made as to whether or not the faces are smiling, smiling face detection unit 360 performs a one-stage process in which the object detection unit distinguishes between smiling faces and those objects that are not smiling faces. Rather than having the classifiers train between examples that are faces and examples that are non-faces, the classifiers train between examples that are smiling faces and examples that are not smiling faces.

Although an embodiment of object detection is described in greater detail in U.S. Pat. No. 7,961,908, briefly each classifier operates as follows in one embodiment. For each frame, the classifier is configured to establish boundaries of windows in the frame. The classifier then evaluates data within individual windows with respect to stored data of a first set of features of the particular type of object and assigns first scores to the individual windows that represent a likelihood of the presence of the first set of features of the particular type of object in the corresponding individual windows. The classifier then compares the first scores with a predetermined first threshold to determine a first group of windows having first scores indicative of the likelihood of the presence of the first set of features of the particular type of object and accordingly to reject those of the individual windows other than those of the first group.

The first group of the windows is one or more but less than all of the windows. The classifier then evaluates data within the individual selected windows of the first group, but not the rejected windows, with respect to stored data of a second set of features of the particular type of object. The classifier then assigns second scores to the individual windows of the first group that represent the likelihood of the presence of the second set of features of the particular type of object in the corresponding individual windows of the first group. The classifier then compares the second scores with a predetermined second threshold to determine a second group of windows having second scores indicative of the likelihood of the presence of the second set of features of the particular type of object, accordingly rejecting those of the individual windows of the first group other than those of the second group. As discussed above, the classifier is trained such that the "particular type of image" is a smiling face.

The classifiers operate in series such that the determination as to whether or not the windows includes a smiling face is more detailed and complicated each subsequent round. The windows not rejected by the first classifier to proceed to the next classifier, and so forth. Each subsequent classifiers is stronger than the previous classifiers in the series such that the object must resemble a smiling face more and more in order to not be rejected in subsequent rounds. This allows windows that obviously do not contain smiling faces, such a window that contains nothing but a white wall in the background, to be rejected quickly.

In some embodiments, a different suitable method of object tracking may be used in place of the method described in U.S. Pat. No. 7,961,908, but regardless the method should use object detection that distinguishes between smiling faces and those objects that are not smiling faces.

Smiling face tracking unit 370 is configured to track smiling faces in the input image. In some embodiments, smiling unit 370 is implemented in the same manner as the face tracking unit described in patent application 2010/0021008, titled "System and Method for Face Tracking", herein incorporated by reference, except that smiling face tracking unit 370 tracks smiling faces rather than faces. During training of smiling face tracking unit 370, smiling face tracking unit 370 is fed with list of smiling face objects instead of a tracking list of face objects as described in U.S. patent application 2010/0021008.

In some embodiments, a different suitable method of tracking may be used by smiling face tracking unit 370 in place of the method described in U.S. patent application 2010/0021008, but smiling faces are tracked by unit 370 rather than faces.

Combining unit 380 is configured to combine the list of new detected smiling faces and the tracked smiling faces to providing the list of smiling faces to be tracked by tracking 370.

It is possible for system 350 to wrongly detect clutter objects or non-smiling faces as smiling faces. It is preferable to avoid false detection of smiling faces in the smile detection algorithm since the camera could otherwise capture empty images where no face in the scene, or with faces that are not smiling. Clutter filter unit 390 is configured for reducing the number of false detections. Clutter filter unit 390 is configured to calculate the average detection confidence level over n frames (n>1) and pass only faces with an average detection confidence level that is higher than a predetermined threshold. The confidence level here relates to the confidence that the tracked smiling face is in fact a smiling face.

In some applications of some embodiments of process 350, the camera is focusing on the smiling faces and capturing the image. But in some embodiments in some applications, the camera focusing time is critical and the focusing process is done prior to smile detection. Accordingly, in some embodiments, the camera focuses on non-smiling faces in the image and captures the image immediately when a non-smiling face starts smiling. In some embodiments in which camera focusing time is critical, this is accomplished by independently and concurrently executing face-detection and smiling-face detection applications and employing the face detection application for focusing and employing the smiling face detection algorithm for image capturing.

Although various embodiments discussed above involve smiling face detection and tracking, some embodiments may employ smiling face detection only and not smiling face tracking, using the smiling face detection method discussed above. For example, smiling face detection may be employed after capturing photo in still mode. These embodiments and others are also within the scope and spirit of the invention.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A method, comprising:
   generating a first list of new smiling faces for a first frame of a plurality of frames based on performing smiling face detection employing an object classifier that is trained to distinguish between smiling faces and objects in the first frame that are not smiling faces;
   employing the first list of new smiling faces from the first frame as a first input smiling face list for a second frame of the plurality of frames;
   generating a list of tracked smiles for the second frame, comprising tracking smiling faces in the second frame from the first input smiling face list for the second frame;
   generating a second list of new smiling faces for the second frame based on employing the object classifier, the object classifier trained to distinguish between smiling faces and objects in the second frame that are not smiling faces; and
   generating a combined list of smiling faces as a second input smiling face list for a third frame of the plurality of frames based on combining the second list of new smiling faces for the second frame with the list of tracked smiles for the second frame.

2. The method of claim 1, wherein the plurality of frames is associated with a preview image of a digital camera.

3. The method of claim 1, wherein generating the list of tracked smiles for the second frame includes:
   detecting of an image in the second frame based on at least one of coordinate or scale values of smiling faces in the first input smiling list for the second frame.

4. The method of claim 1, further comprising:
   performing face detection and face tracking, and focusing a camera based on the face tracking, wherein the face detection and the face tracking occurs concurrently with and independently of the smiling face detection and the tracking of smiling faces.

5. The method of claim 1, wherein
   the object classifier includes a plurality of classifiers.

6. The method of claim 5, wherein at least one of the plurality of classifiers is configured to, for each of the first, second, and third frames:
   establish boundaries of windows in one of the first, second, or third frames, evaluate data within individual windows with respect to stored data of a first set of features of the particular type of object and assign first scores to the individual windows that represent a likelihood of the presence of the first set of features of the particular type of object in the corresponding individual windows, compare the first scores with a predetermined first threshold to determine a first group of windows having first scores indicative of the likelihood of the presence of the first set of features of the particular type of object and thereby to reject those of the individual windows other than those of the first group, wherein said first group of the windows is one or more but less than all of the windows, thereafter evaluate data within the individual selected windows of the first group, but not the rejected windows, with respect to stored data of a second set of features of the particular type of object and assign second scores to the individual windows of the first group that represent the likelihood of the presence of the second set of features of the particular type of object in the corresponding individual windows of the first group, and compare the second scores with a predetermined second threshold to determine a second group of windows having second scores indicative of the likelihood of the presence of the second set of features of the particular type of object and thereby to reject those of the individual windows of the first group other than those of the second group, wherein the particular type of image is a smiling face.

7. The method of claim 1, further comprising:
   generating a list of output smiling faces by filtering the list of tracked smiles for the second frame.

8. The method of claim 7, wherein
   filtering the list of tracked smiles for the second frame includes removing each smiling face in the second frame having an average confidence level that is below a threshold confidence level.

9. An apparatus, comprising:
   an image detector that is configured to output a plurality of frames; and an image processor configured to perform actions, including:
- generating a first list of new smiling faces for a first frame of the plurality of frames based on performing smiling face detection employing an object classifier that is trained to distinguish between smiling faces and objects in the first frame that are not smiling faces;
- employing the first list of new smiling faces from the first frame as a first input smiling face list for a second frame of the plurality of frames;
- generating a list of tracked smiles for the second frame, comprising tracking smiling faces in the second frame from the first input smiling face list for the second frame;
- generating a second list of new smiling faces for the second frame based on employing the object classifier, the object classifier trained to distinguish between smiling faces and objects in the second frame that are not smiling faces; and
- generating a combined list of smiling faces as a second input smiling face list for a third frame of the plurality of frames based on combining the second list of new smiling faces for the second frame with the list of tracked smiles for the second frame.

10. The apparatus of claim 9, wherein the apparatus includes a digital camera that includes the image detector and the image processor, wherein the plurality of frames is associated with a preview image of the digital camera.

11. The apparatus of claim 9, wherein the image processor is further configured such that generating the list of tracked smiles for the second frame includes:
- detecting of an image in the second frame based on at least one of coordinate or scale values of smiling faces in the first input smiling list for the second frame.

12. The apparatus of claim 9, wherein the image processor is configured to provide further actions, including:
- performing face detection and face tracking, and focusing a camera based on the face tracking, wherein the face detection and the face tracking occurs concurrently with and independently of the smiling face detection and the tracking of smiling faces.

13. The apparatus of claim 9, wherein the object classifier includes a plurality of classifiers.

14. The apparatus of claim 13, wherein the image processor is configured such that at least one of the object classifiers is configured to, for each of the first, second, and third frames:
- establish boundaries of windows in one of the first, second, or third frames, evaluate data within individual windows with respect to stored data of a first set of features of the particular type of object and assign first scores to the individual windows that represent a likelihood of the presence of the first set of features of the particular type of object in the corresponding individual windows, compare the first scores with a predetermined first threshold to determine a first group of windows having first scores indicative of the likelihood of the presence of the first set of features of the particular type of object and thereby to reject those of the individual windows other than those of the first group, wherein said first group of the windows is one or more but less than all of the windows, thereafter evaluate data within the individual selected windows of the first group, but not the rejected windows, with respect to stored data of a second set of features of the particular type of object and assign second scores to the individual windows of the first group that represent the likelihood of the presence of the second set of features of the particular type of object in the corresponding individual windows of the first group, and compare the second scores with a predetermined second threshold to determine a second group of windows having second scores indicative of the likelihood of the presence of the second set of features of the particular type of object and thereby to reject those of the individual windows of the first group other than those of the second group, wherein the particular type of image is a smiling face.

15. The apparatus of claim 9, wherein the image processor is configured to perform further actions, including:
- generating a list of smiling faces by filtering the list of tracked smiles for the second frame.

16. The apparatus of claim 15, wherein the image processor is configured such that:
- filtering the list of tracked smiles for the second frame includes removing each smiling face in the second frame having an average confidence level that is below a threshold confidence level.

17. A non-transitory tangible, processor-readable storage medium that is configured to encode processor-readable code, which, when executed by one or more processors, enables actions, including, comprising:
- generating a first list of new smiling faces for a first frame of a plurality of frames based on performing smiling face detection employing an object classifier that is trained to distinguish between smiling faces and objects in the first frame that are not smiling faces;
- employing the first list of new smiling faces from the first frame as a first input smiling face list for a second frame of the plurality of frames;
- generating a list of tracked smiles for the second frame, comprising tracking smiling faces in the second frame from the first input smiling face list for the second frame;
- generating a second list of new smiling faces for the second frame based on employing the object classifier, the object classifier trained to distinguish between smiling faces and objects in the second frame that are not smiling faces; and
- generating a combined list of smiling faces as a second input smiling face list for a third frame of the plurality of frames based on combining the second list of new smiling faces for the second frame with the list of tracked smiles for the second frame.

18. A system, comprising:
- an image detector that is configured to output a plurality of frames:
- a memory for storing at least instructions; and
- processor device that executes the instructions to enable actions, including:
  - detecting smiling faces in a first frame of the plurality of frames based on performing smiling face detection employing an object classifier that is trained to distinguish between smiling faces and objects in the first frame that are not smiling faces; and
  - generating a first list of new smiling faces based on the detected smiling faces in the first frame;
  - employing the first list of new smiling faces from the first frame as a first input smiling face list for a second frame of the plurality of frames;
  - generating a list of tracked smiles for the second frame, comprising tracking smiling faces in the second frame from the first input smiling face list for the second frame;
  - generating a second list of new smiling faces for the second frame based on employing the object classifier, the object classifier trained to distinguish between smiling faces and objects in the second frame that are not smiling faces; and generating a combined list of smiling faces as a second input smiling face list for a third frame of the plurality based on combining the second list of new smiling faces for the second frame with the list of tracked smiles for the second frame.

19. The system of claim 18, wherein the object classifier includes a plurality of classifiers.

20. The system of claim 19, further comprising, wherein at least one of the plurality of classifiers is configured to, for at least one of the first, second, and third frames:

establish boundaries of windows in the at least one of the first, second, or third frames, evaluate data within individual windows with respect to stored data of a first set of features of the particular type of object and assign first scores to the individual windows that represent a likelihood of the presence of the first set of features of the particular type of object in the corresponding individual windows, compare the first scores with a predetermined first threshold to determine a first group of windows having first scores indicative of the likelihood of the presence of the first set of features of the particular type of object and thereby to reject those of the individual windows other than those of the first group, wherein said first group of the windows is one or more but less than all of the windows, thereafter evaluate data within the individual selected windows of the first group, but not the rejected windows, with respect to stored data of a second set of features of the particular type of object and assign second scores to the individual windows of the first group that represent the likelihood of the presence of the second set of features of the particular type of object in the corresponding individual windows of the first group, and compare the second scores with a predetermined second threshold to determine a second group of windows having second scores indicative of the likelihood of the presence of the second set of features of the particular type of object and thereby to reject those of the individual windows of the first group other than those of the second group, wherein the particular type of image is a smiling face.

\* \* \* \* \*